UNITED STATES PATENT OFFICE.

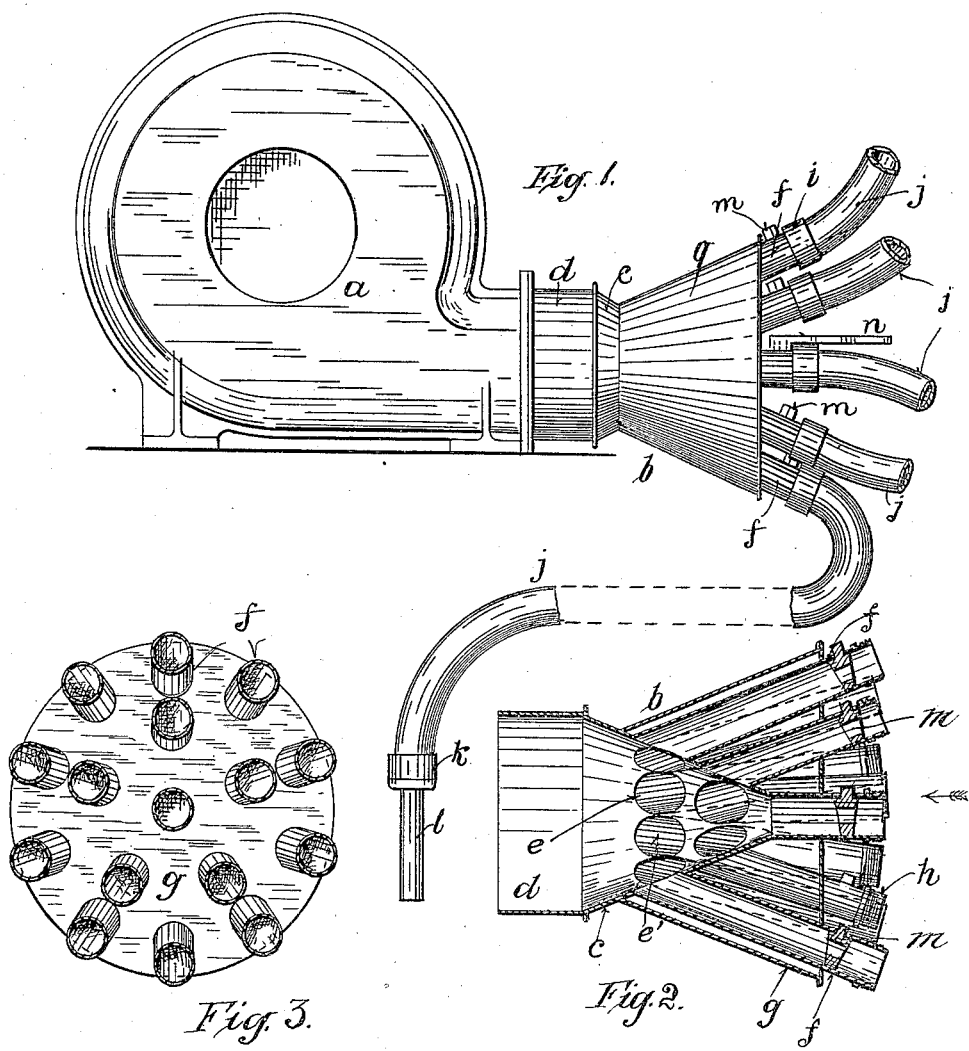

WILLIAM T. HENDRYX, OF PORTLAND, OREGON, ASSIGNOR OF ONE-HALF TO JOHNSTON PUGSLEY PORTER, OF PORTLAND, OREGON.

AIR-BLAST DISTRIBUTER.

952,522.      Specification of Letters Patent.      Patented Mar. 22, 1910.

Application filed June 9, 1909. Serial No. 501,198.

*To all whom it may concern:*

Be it known that I, WILLIAM T. HENDRYX, a citizen of the United States, and a resident of Portland, in the county of Multnomah and State of Oregon, have invented a new and useful Improvement in Air-Blast Distributers, of which the following is a specification, reference being had to the accompanying drawings as constituting a part thereof.

This invention has for its object to provide for the even distribution of the volume of air generated by a fan, or other high-pressure blower, and my invention resides in the combination with the discharge end of the blower, of a cone-shaped primary nozzle provided with a plurality of apertures, so arranged as to prevent any retardation of the current of air in seeking an outlet through any of the apertures, but to the contrary, inducing the discharge of air by the fan evenly, that is, in equal portions through each of the apertures, and providing each of the apertures, exterior of the cone, with nipples adapted to have lengths of hose coupled thereto for the purpose of conveying the air to a distant place.

One of the practical uses of my invention is, for example, in the burning out of stumps in a field to be converted into agricultural use. Under such circumstances, a hole is drilled into the stump, and the latter ignited in such cavity; and then air is furnished through a nozzle provided at the discharge end of the hose connected with my distributer, so as to promote and continue the combustion of the stump in one or several places at a time, until the stump has been entirely consumed.

In the drawings: Figure 1 is a side elevation of a high-pressure blower or fan of the type commonly found in use, provided with my air-distributing attachment. Fig. 2 is a longitudinal, vertical, central section of my distributer; and Fig. 3 is an end view looking in the direction pointed by the arrow in Fig. 2, the coupling ends of the distributing pipes, however, being omitted.

The fan, $a$, as mentioned, is of the common type, and to the discharge end thereof is affixed my distributer $b$. The construction of my distributer is best seen in Fig. 2. It comprises a cone-shaped primary nozzle $c$, provided with a coupling flange $d$, adapted to be affixed on the discharge end of the fan. The primary nozzle $c$ is provided with a plurality of apertures $e$, $e'$, preferably of uniform cross section, which open into radially arranged pipes $f$, also of uniform cross section, which are inclosed and braced, or reinforced as it were, by a casing $g$. The outer ends of the pipes $f$ are respectively provided with a coupling piece $h$, adapted to have affixed thereon the corresponding coupling piece $i$ of a hose $j$. If the hose $j$ is intended to be used for feeding air to the burning cavity of a stump of a tree, the same would be provided at its discharge end with coupling means $k$, so as to couple thereon a smaller piece of pipe $l$, constituting a nozzle. The outer ends of the pipes $f$ may be made with valves or gates having projecting key-stems $m$, adapted to receive a key $n$, so that, if desired, any of the nipples $f$ may be cut off, when not to be used. However, in the practical use of my device, it is desirable, as far as possible, to keep all the discharge nipples $f$ open, so as to facilitate the even distribution and discharge of air generated by the fan.

I claim:

1. In combination with a blower, a cone-shaped primary nozzle formed with a coupling flange by which it is removably fastened to the discharge end of the blower, provided with a plurality of apertures of uniform cross section, pipes covering said apertures on the exterior of the primary nozzle, and a case inclosing and bracing said pipes exterior of the primary nozzle.

2. In combination with a blower, a cone-shaped primary nozzle formed with a coupling flange by which it is removably fastened to the discharge end of the blower, provided with a plurality of apertures of uniform cross section, pipes covering said apertures on the exterior of the primary nozzle, a case inclosing and bracing said pipes exterior of the primary nozzle, and valves in the extremities of the pipes.

3. In combination with a blower, a cone-shaped primary nozzle formed with a coupling flange by which it is removably fastened to the discharge end of the blower, provided with a plurality of apertures of uniform cross section, a case inclosing and bracing said pipes exterior of the primary nozzle, valves in the extremities of the pipes, and the extremities of said pipes being adapted to have other lengths of pipes attached thereto.

4. In combination with a blower, a cone-shaped primary nozzle having openings in its inclined walls, a plurality of pipes fitting in the openings, said pipes being arranged to flare outwardly from the inclined walls of the nozzle, a valve on each pipe, and a conical case formed with openings in which the pipes fit to support them, the said case inclosing the inner ends of the pipes.

WILLIAM T. HENDRYX.

Witnesses:
CECIL LONG,
JOHN APERB.